though the Andersen teaching is not suitable for insulated pipe constructions which employ more than one conduit within the outer casing. Other methods of making insulated pipe have utilized complex machines which are not only expensive to manufacture and operate, but do not provide an insulation material having a uniform density throughout the lengths of the pipe segments. The present invention overcomes the disadvantages in the prior art insulated pipe constructions by providing insulated pipe and method of making the same wherein one or more flow conduits are centered within an outer tubular casing and a monolithic urethane foam insulating material is selectively formed between the conduits and casing to provide uniform insulating density throughout the length of the pipe.

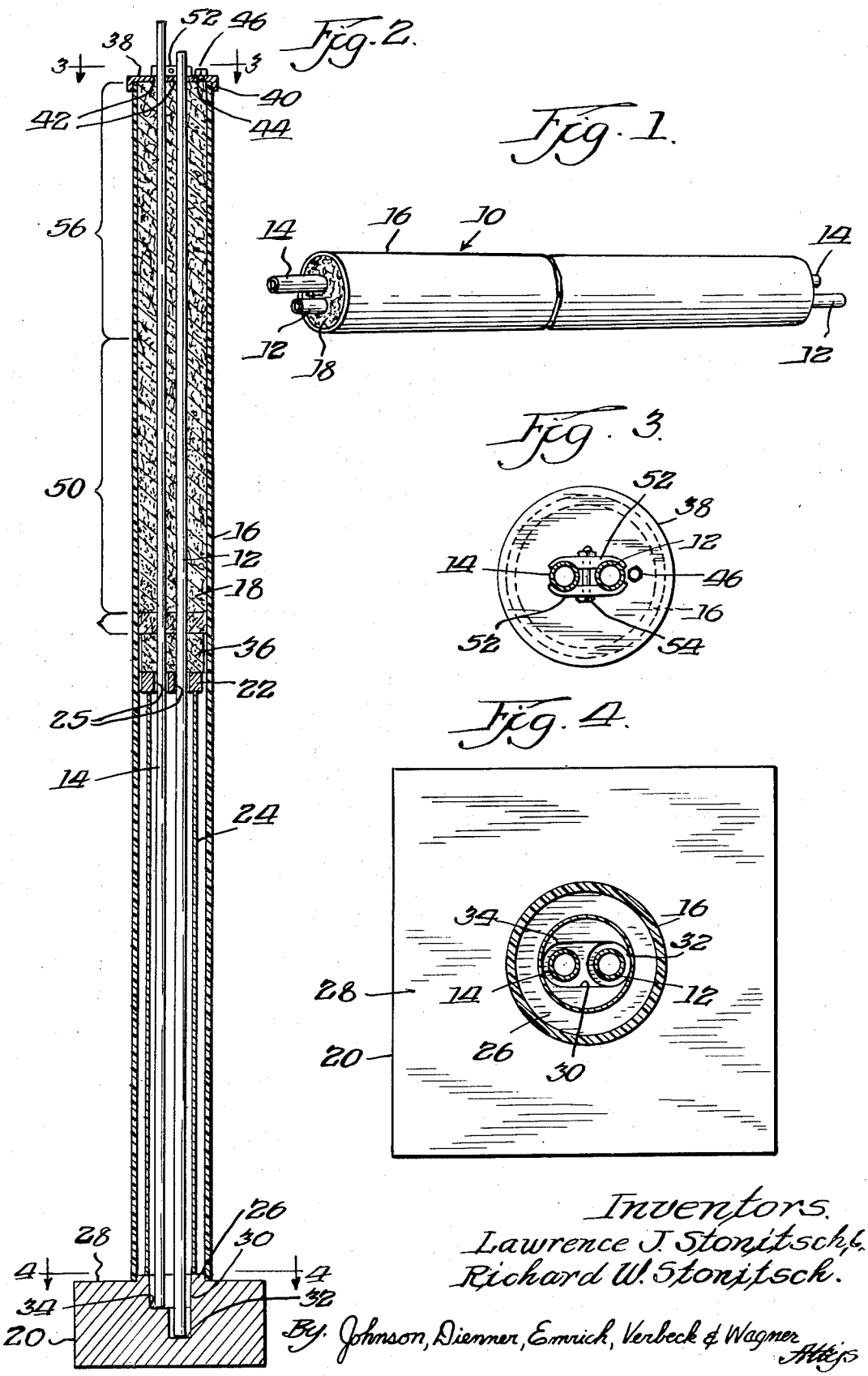

United States Patent Office 3,793,411
Patented Feb. 19, 1974

3,793,411
METHOD FOR MAKING INSULATED PIPE
Lawrence J. Stonitsch, Plainfield, and Richard W. Stonitsch, Crest Hill, Ill., assignors to Rovanco, Inc., Joliet, Ill.
Filed Apr. 20, 1971, Ser. No. 135,616
Int. Cl. B29d 27/04; F16l 9/14, 9/22
U.S. Cl. 264—45                                    8 Claims

ABSTRACT OF THE DISCLOSURE

An insulated flow conduit construction having one or more flow conduits centered within a tubular outer casing with unitary monolithic insulating urethane foam means disposed between the conduits and the outer casing. A centering fixture is employed to initially center the flow conduits within the outer casing and urethane foam is then introduced into the casing in a controlled manner, the centering fixture being removed prior to completion of filling with urethane foam.

BACKGROUND OF THE INVENTION

The present invention relates generally to insulated pipe and flow conduits, and more particularly to a method of making pre-insulated pipe wherein flow conduits are disposed generally centrally within an outer casing with unitary insulating foam between the conduits and the casing.

By "preinsulated" pipe is meant flow pipe or conduit which is encased in an insulation material during manufacture at a site removed from the site of installation so that the conduits are ready for end-to-end connection and the like upon reaching the job site rather than having to be wrapped or insulated at the job site. The prior art insulated pipes have conventionally utilized insulating wrap materials which are wrapped around lengths of conduit and thereafter coated in an attempt to provide an impervious coating over the insulation material. The prior art insulated conduits or pipes have exhibited many disadvantages which have prevented wide acceptance and use in the industry. Attempts have been made to construct insulated flow conduits or pipes wherein a length of tubular conduit is positioned within an outer casing and an insulating material is inserted between the conduit and the outer casing. To some extent, the drawbacks in conventional wrapped insulated pipe have been overcome by the use of foamed urethane insulation material between the flow conduits and an outer tubular casing or sheath. These prior art insulated pipe constructions have, however, failed to maintain the flow conduits centrally within the outer casings so that in-line connection of lengths of pipe is difficult, particularly when working in close space and tolerance ranges. The failure of the prior art insulated pipe constructions to maintain the flow conduits centered relative to outer tubular casings has been particularly prevalent where substantially long pipe sections are constructed, such as in the area of twenty foot lengths. In addition, the prior art methods of making insulated pipe or conduit, particularly those methods using a foamed urethane insulating material, have not been successful in obtaining a uniform density of insulation material throughout the lengths of conduit. As a consequence the prior art insulated pipe constructions have not exhibited uniform heat transfer throughout their lengths thereby resulting in relative cold spots along the lengths of the conduit which adversely affect the desired uniformity in temperature of fluids flowing in the conduits.

An example of a single conduit insulated pipe construction utilizing organic foamed insulation material is disclosed in U.S. Pat. No. 3,394,207 to Ege Andersen, dated July 23, 1968. The method taught in the cited Andersen patent, however, requires the use of a parting agent and fails to solve the problem of centering one or more conduits within the outer tubular casing. Moreover, the Andersen teaching is not suitable for insulated pipe constructions which employ more than one conduit within the outer casing. Other methods of making insulated pipe have utilized complex machines which are not only expensive to manufacture and operate, but do not provide an insulation material having a uniform density throughout the lengths of the pipe segments. The present invention overcomes the disadvantages in the prior art insulated pipe constructions by providing insulated pipe and method of making the same wherein one or more flow conduits are centered within an outer tubular casing and a monolithic urethane foam insulating material is selectively formed between the conduits and casing to provide uniform insulating density throughout the length of the pipe.

SUMMARY OF THE INVENTION

One of the primary objects of the present invention is to provide a novel method for making an insulated pipe construction having one or more flow conduits disposed centrally within an outer tubular casing with a uniform density monolithic urethane foam insulating material disposed between the conduits and the tubular casing.

Another object of the present invention is to provide a novel method for making such insulated pipe which ensures that the flow conduits are positioned centrally within the outer tubular casing.

A feature of the present invention is the provision of a novel centering method of utilizing a fixture for centering the conduits within the outer casing as the insulating urethane foam is selectively introduced between the conduits and the outer casing.

In carrying out the objects and advantages of the present invention, there is provided an insulated pipe construction wherein one or more flow conduits are disposed centrally within an outer tubular casing made of polyvinyl chloride or other suitable material. A urethane foam insulating material is introduced into the casing between the conduits and tubular casing in a manner to obtain a monolithic uniform density insulating material. The ends of the flow conduits are positioned to extend outwardly of the ends of the outer casing and are staggered relative to each other, considered longitudinally of the pipe construction. In making insulated pipe in accordance with the present invention, a centering fixture is employed to center the conduits within the outer casing with the ends of the conduits extending outwardly of the ends of the casing in staggered relation to each other. The casing and centered conduits are brought to a generally vertical position on a support fixture with the centering fixture maintained generally midlength of the casing. Selective quantities of urethane foam are then controllably introduced into the upper end of the casing and allowed to cure to form a monolithic uniform density insulation between the conduits and outer casing. Prior to complete expansion and curing of the foam, a cap is placed over the upper end of the casing to produce a squared end. After the urethane foam has cured within the upper end of the casing, the centering fixture is removed and the casing and conduits are inverted. The steps of introducing controlled quantities of urethane foam are then repeated for filling the unfilled end of the casing.

Further objects and advantages of the present invention, together with the organization and manner of operation thereof, will become apparent from the following detailed description of the invention when taken in conjunction with the accompanying drawing wherein like reference numerals represent like elements throughout the several views.

BRIEF DESCRIPTION OF THE DRAWING

FIG. 1 is a foreshortened perspective view of an insulated pipe construction in accordance with the present invention showing dual flow conduits supported centrally within an outer casing;

FIG. 2 is a vertical longitudinal sectional view of the dual conduit construction of FIG. 1 for illustrating the method of the present invention;

FIG. 3 is an enlarged top plan view taken substantially along the line 3—3 of FIG. 2 and looking in the direction of the arrows; and FIG. 4 is an enlarged transverse sectional view taken substantially along the line 4—4 of FIG. 2, looking in the direction of the arrows.

DESCRIPTION OF A PREFERRED EMBODIMENT

Referring now to the drawing, and in particular to FIG. 1, an insulated pipe or flow conduit constructed in accordance with one embodiment of the present invention is indicated generally at 10. The particular insulated pipe or flow conduit construction 10 includes a pair of flow conduits 12 and 14 which may comprise tubular flow conduits made of copper, alloy steel, stainless steel, aluminum or other suitable flow conduit material the selection of which is generally established by the fluid to be used with the flow conduits. The flow conduits 12 and 14 are positioned centrally within an outer tubular casing 16 made of an impervious polyvinyl chloride material (PVC) or other suitable preferably light-weight material. A cured urethane foam insulating material 18 is disposed about the conduits 12 and 14 between their outer surfaces and the inner surface of the casing 16 and serves to insulate the flow conduits as well as maintain them in centered positions within the casing 16. The urethane foam insulation material 18 may comprise urethane foam commercially available from Pelron Corp. of Lyons, Illinois under the tradename Ridgid Polyurethane Foam. The flow conduits 12 and 14 are preferably, but not necessarily, of equal length and are positioned within the casing 16 such that a plane containing the longitudinal axes of the conduits also contains the longitudinal axis of the tubular casing 16. The flow conduits 12 and 14 are equidistantly spaced from the center axis of the casing 16 so as to be generally centered as a unit within the casing.

The longitudinal length of the casing 16 is less that the longitudinal lengths of the conduits 12 and 14 such that the ends of the flow conduits extend outwardly of the opposite ends of the casing 16, it being understood that the insulating material 18 forms closed end surfaces about the flow conduits with the opposite end surfaces lying in planes normal to the longitudinal axis of the casing 16. As will become more apparent hereinbelow, the ends of the flow conduits 12 and 14 are spaced from each other, considered longitudinally of the insulated pipe construction 10, outwardly of each end of the casing 16 to facilitate connection to similar insulated pipe sections when connected in end-to-end relation. The insulated pipe sections 10 in accordance with the present invention may be readily manufactured having a longth to diameter ratio of greater than thirty.

FIG. 2 illustrates the dual insulated pipe 10 in an upright position with apparatus used in the manufacture of the insulated pipe sections. As there shown, a length of outer tubular casing 16 is supported in a vertical position on a support fixture of jig 20. A centering fixture having an upper centering disc 22 and a tubular support sleeve 24 is positioned within the casing 16 to center the conduits 12 and 14 within the casing. The centering disc 22 has a pair of spaced openings 25 therethrough to receive the conduits 12 and 14 in sliding relation therein. In this manner, the centering disc may be received over the lower ends of the conduits 12 and 14 when in a horizontal position within the casing 16 and moved to a position generally midlength of the casing, the support sleeve 24 having a longitudinal length equal to approximately one-half the length of the casing.

The support fixture 20 has an upstanding cylindrical boss portion 26 having an outer peripheral configuration adapted to be snugly received within the lower end of the casing 16 to provide locating means therewith. The lowermost end of the casing 16 engages the upper surface 28 of the support fixture. A stepped recess or cavity 30 having lower horizontal vertically spaced or stepped surfaces 32 and 34 is provided in the support fixture 20 intersecting the upper surface of the boss 26, the horizontal surfaces 32 and 34 serving to provide reference support surfaces for the flow conduits 12 and 14 when disposed in vertical position during manufacture of making the insulated pipe 10.

A sealing disc member 36 made of cured urethane foam is supported above the centering fixture 12 and has openings therein similar to the openings 25 in centering disc 22 to receive the flow conduit 12 and 14 therethrough. The urethane disc 30 has an outer peripheral surface allowing it to readily slide axially with the centering disc 22 to a position midlength of the casing 16.

A circular metallic sealing cap 38 having a downwardly depending annular flange 40 is adapted to be received over the upper ends of the conduits 12 and 14 for engaging the upper end of the casing 16. To this end, the cap 38 has a pair of spaced openings 42 therein to receive and center the upper ends of the conduits. The cap 38 has a threaded opening 44 which receives a threaded plug 46. The plug 46 is removable from the cap 38 to allow release of gas pressure during expansion and curing of the urethane foam 18 as will be described.

In accordance with the following described method of making an insulated pipe section 10, a pipe section may be readily manufactured having two or more flow conduits centered in a tubular casing of twenty foot longitudinal length. The method of manufacture in accordance with the present invention makes it possible to produce lengths of insulated pipe having substantially greater length-to-diameter ratios than the prior art insulated pipe constructions.

With reference to Fig. 2, the method of making the dual insulated pipe 10 in accordance with the present invention is as follows. A length of tubular casing 16, such as a twenty foot section, is placed in a horizontal position and the pair of tubular conduits 12 and 14 are positioned longitudinally within the casing. A urethane cap 36 and the centering fixture 22 are then inserted onto what will be termed the lower ends of the flow conduits and moved axially within the casing 16 along the conduits by the support sleeve 24 to a position wherein the urethane cap and centering fixture are disposed generally midlength of the outer casing. Thereafter, the casing, urethane cap and centering fixture are positioned vertically on the support fixture 20 with the conduits 12 and 14 resting, respectively, on the horizontal support surfaces 32 and 34 in the support fixture. The upper end of the casing 16 is then preferably clamped by means (not shown) to stabilize the elongated casing on the support fixture 20. Using a commercially available foaming apparatus, such as a Binks Formulator Model #C manufactured by Binks Manufacturing Company of Chicago, Ill., a predetermined quantity, for example, one to two ounces, of foamable urethane insulating material as aforedescribed is introduced into the upper end of the open casing 16 by a foam injection gun (not shown) having an elongated nozzle for inserting the foam downwardly into the upper end of the casing adjacent the urethane sealing cap 36. This relatively small initial quantity of urethane foam poured is allowed to cure whereupon it seals over the urethane cap 36 between the cap and the outer casing and between the cap openings 25 and the flow conduits to prevent subsequent flow of foamable material downwardly past the centering fixture 22. After curing of the sealing portion of urethane foam, a second stage or pour of urethane foam is introduced sufficient, upon curing, to fill the casing 16 to the level indicated at 50 which is approximately one-half the distance from the sealing cap 36 to the upper end of the casing. The cap 38 is then placed on the upper end of casing 16 with the plug 46 removed and the second stage pour of urethane foam is allowed to expand during curing to obtain a uniform density. Thereafter, the cap plate 38 is removed and a third stage pour of foamable urethane insulating material, generally equal in quantity to the second stage pour, is introduced onto the cured second stage pour. The upper cap 38 is again inserted over the upper ends of the flow conduits 12 and 14 and secured onto the upper end of the casing 16 by suitable retaining means such as clamp members 52 which are releasably secured to the flow conduits by a connecting bolt 54 adjacent the upper surface of the cap 38. The plug 46 is removed from the vent opening 44 of the cap 38 after initial introduction or pouring of the third stage urethane foam. The third stage urethane foam pour is then allowed to cure and expand upwardly to fill the cavity length 56 in the casing. When the expanding urethane reaches a height approximately three inches from the lower surface of the cap 38, the plug 46 is inserted into the opening 44 to close off the vent flow and insure pressure expansion against the lower end of the cap whereby to obtain a squared end about the conduits. The temperature of the foam when injected or poured into the casing is maintained between approximately 65 to 85° F. with 75° F. being found to provide good pouring characteristics under most conditions. The exact pouring temperature selected may vary according to the temperature and humidity conditions surrounding the work station.

After the third stage urethane pour has cured, the retainer clamps 52 and the upper cap 38 are removed from the upper end of the casing 16. The centering fixture 22 and support sleeve 24 are then removed from the casing 16 and the casing and conduits are inverted such that the open end of the casing extends generally vertically upwardly. The steps of inserting predetermined quantities of foamable urethane as above described for the second and third stage pours are then repeated into the now upper open end of the casing 16, the lower filled end of the casing being supported by the fixture 20. During the latter pouring and with the casing inverted, the urethane cap 36 provides a base upon which and to which the urethane pours integrally attach. In this manner, a monolithic insulation material of uniform density is provided which ensures uniform heat transfer and prevents "cold spots" within the insulation material. The urethane cap 36 also eliminates the need for further centering means for the flow conduits midlength of the casing.

It will be noted that the method of making the dual insulated pipe 10 in accordance with the present invention does not require a parting agent as heretofore required in the prior art methods. In addition, the method in accordance with the present invention insures that the flow conduits 12 and 14 are centered within the outer casing 16 during manufacture. The latter feature provides a substantial improvement over the prior art inslated pipe construction in which the flow conduits were not consistently maintained in centered positions within their outer tubular casings.

While the subject invention has been described with respect to a dual insulated pipe construction, it will be understood that the basic inventive concept may be readily applied to the manufacture of insulated pipe constructions having one or more fluid flow conduits supported within an outer casing 16 with an insulating urethane foam material disposed between the conduits and the casing. Thus, while a preferred embodiment of the present invention has been shown and described, it will be understood by those skilled in the art that changes and modifications may be made therein without departing from the invention in its broader aspects.

We claim:
1. The method of making insulated flow conduit comprising the steps of:
 (a) inserting a flow conduit into a hollow casing, with the corresponding ends of said conduit and casing disposed in substantial juxtaposition,
 (b) radially centering said flow conduit within said casing by a removable centering fixture at about the midlength position of said casing,
 (c) positioning said casing and centered conduit in a substantially vertical position and providing an obstruction around said conduit adjacent said midlength position in association with the centering fixture and through which the conduit extends,
 (d) introducing a first predetermined quantity of foamable urethane insulating material into said casing adjacent said obstruction and allowing it to foam and expand and form across the obstruction a seal between said conduit and the inner surface of said casing,
 (e) introducing a second predetermined quantity of foamable urethane insulating material into said casing in an amount sufficient to fill less than the entire remaining space above said first quantity of foam upon curing and thereafter allowing said second quantity of material to expand and cure,
 (f) introducing at least one additional quantity of foamable urethane insulating material into the space disposed above said cured second quantity of foam and allowing each additional such quantity to expand and cure,
 (g) inverting said flow conduit and casing end for end with removal of said centering fixture from association with the obstruction, and
 (h) thereafter repeating steps (e) through (f).

2. The method of claim 1 including the steps of capping the upper end of said casing to effect expansion of the final quantity of foamable material against the capping means, and venting the upper end of said casing to atmosphere until said final quantity of foamable material has expanded to a predetermined position beneath said capping means.

3. The method of claim 1 wherein a second flow conduit is initially inserted into said casing.

4. The method of claim 3 wherein said two flow conduits are positioned within said casing with the ends of said conduits extending outwardly from the ends of said casing and being longitudinally spaced relative to each other.

5. The method of making insulated flow conduit, comprising the steps of:
 (a) inserting a flow conduit into a hollow casing,
 (b) radially centering said flow conduit within said casing by removable centering means positioned about midlength within the casing and in association with an obstruction through which the conduit extends,
 (c) introducing a first predetermined quantity of an expendable urethane foam material into one end of said casing to deposit foam about said conduit and adjacent the longitudinal center of said casing,
 (d) allowing said first quantity of foam to expand and form across the obstruction a seal between said conduit and the inner surface of said casing,
 (e) thereafter introducing successive predetermined quantities of said expandable urethane foam material into said casing with each successive quantity being allowed to fully expand before the next quantity is introduced so as to obtain a uniform expanded foam density about said conduit throughout the length of said casing from said centered portion to said one end thereof,
 (f) and thereafter removing the centering means from association with the obstruction and repeating step (e) from the opposite end of said casing.

6. The method of making insulated flow conduit as defined in claim 5 including the steps of mounting a capping member onto the said one end of said casing after inserting the last predetermined quantity of expandable foam into said one end of said casing, said capping member being mounted on said casing prior to complete expansion of said last quantity of foam to effect expansion of the foam against the capping member, removing the capping member from said one end of said casing after said last quantity of foam has cured, and repeating the capping step when introducing foam from said opposite end of said casing.

7. The method of making insulated flow conduit as defined in claim 5 wherein said predetermined quantities of expandable foam material are introduced into said one end of said casing after said casing and conduit are moved to a generally vertical position, said casing and conduit being inverted end-for-end when introducing said predetermined quantities of foam material from said opposite end of said casing.

8. The method of making insulated flow conduit as defined in claim 5 wherein said expandable foam material comprises urethane foam.

References Cited

UNITED STATES PATENTS

| | | | |
|---|---|---|---|
| 3,439,075 | 4/1969 | Bauer | 264—45 |
| 3,359,351 | 12/1967 | Bender | 264—45 |
| 3,514,507 | 5/1970 | Van Dop | 264—45 |
| 3,394,207 | 7/1968 | Andersen | 264—45 |
| 3,366,718 | 1/1968 | Komada | 264—45 |
| 3,444,280 | 5/1969 | Pulaski | 264—45 |
| 3,512,323 | 5/1970 | Hupfer | 264—45 X |
| 3,444,279 | 5/1969 | Dost | 264—45 |
| 3,229,441 | 1/1966 | Heffner | 264—45 XR |
| 3,432,582 | 3/1969 | Bender | 264—47 |
| 3,559,660 | 2/1971 | Rollins | 138—149 |

OTHER REFERENCES

Rubber and Plastics Age, "Foamed Cored Panels for Transport," vol. 44, No. 5, May 1963, pp. 499–500 (cellular polymers).

PHILIP E. ANDERSON, Primary Examiner

U.S. Cl. X.R.

138—Dig. 9; 264—275